United States Patent
Fang et al.

(10) Patent No.: US 9,313,685 B2
(45) Date of Patent: Apr. 12, 2016

(54) ENHANCEMENT OF ACCESS CONTROL FOR CDMA2000

(71) Applicants: ZTE Corporation, Shenzhen (CN); ZTE (USA) Inc., Morristown, NJ (US)

(72) Inventors: Yonggang Fang, San Diego, CA (US); YuanFang Yu, Shenzhen (CN); Ting Lu, Beijing (CN); Xiaowu Zhao, Shenzhen (CN)

(73) Assignees: ZTE Corporation, Shenzhen (CN); ZTE (USA) Inc., Austin, TX (US)

( * ) Notice: Subject to any disclaimer, the term of this patent is extended or adjusted under 35 U.S.C. 154(b) by 116 days.

(21) Appl. No.: 13/760,967

(22) Filed: Feb. 6, 2013

(65) Prior Publication Data

US 2013/0203402 A1      Aug. 8, 2013

(30) Foreign Application Priority Data

Feb. 6, 2012   (WO) ................ PCT/CN2012/070902

(51) Int. Cl.
| | |
|---|---|
| *H04W 24/00* | (2009.01) |
| *H04W 28/02* | (2009.01) |
| *H04W 74/00* | (2009.01) |
| *H04W 28/06* | (2009.01) |
| *H04W 52/02* | (2009.01) |
| *H04W 56/00* | (2009.01) |

(52) U.S. Cl.
CPC ........ *H04W 28/0247* (2013.01); *H04W 74/002* (2013.01); *H04W 28/06* (2013.01); *H04W 52/0209* (2013.01); *H04W 56/00* (2013.01)

(58) Field of Classification Search
CPC .............. H04W 74/002; H04W 28/06; H04W 28/0247; H04W 52/0209; H04W 56/00
USPC .......... 455/515, 516, 453; 370/431, 445, 447, 370/448
See application file for complete search history.

(56) References Cited

U.S. PATENT DOCUMENTS

| | | | |
|---|---|---|---|
| 6,754,501 B1* | 6/2004 | McRae et al. .................. | 455/453 |
| 8,379,606 B2* | 2/2013 | Kim et al. ...................... | 370/337 |
| 2006/0018336 A1* | 1/2006 | Sutivong et al. .............. | 370/437 |
| 2006/0046762 A1* | 3/2006 | Yoon et al. .................... | 455/519 |
| 2009/0232084 A1* | 9/2009 | Li et al. .......................... | 370/330 |
| 2011/0044300 A1* | 2/2011 | Joshi et al. .................... | 370/336 |

* cited by examiner

*Primary Examiner* — Ajit Patel
(74) *Attorney, Agent, or Firm* — Perkins Coie LLP

(57) ABSTRACT

This document provides wireless communications technologies, including methods, devices and systems. For example, a method of facilitating wireless communications is provided to include operating a wireless network to receive an access probe transmission from an access terminal requesting an access channel grant; perform, based on the received access probe transmission, a persistence test with the access terminal; receive a subsequent probe transmission for the access channel grant request; and perform, based on the received subsequent probe transmission, a subsequent persistence test with the access terminal.

10 Claims, 4 Drawing Sheets

ENHANCEMENT OF ACCESS CONTROL FOR CDMA2000

CROSS REFERENCE TO RELATED APPLICATIONS

This document claims the right of priority under 35 U.S.C. §119(a) and the Paris Convention of International Patent Application No. PCT/CN2011/077107, filed on Jul. 13, 2011. The entire content of the before-mentioned patent application is incorporated by reference herein.

BACKGROUND

This document relates to wireless communications. Examples of various wireless technologies include Code division Multiple Access (CDMA) such as CDMA2000 1x and/or High Rate Packet Data (HRPD), and Long-Term Evolution (LTE).

SUMMARY

This document provides wireless communications technologies, including methods, devices and systems.

In one aspect, a method of facilitating wireless communications is provided to include operating a wireless network to receive an access probe transmission from an access terminal requesting an access channel grant; perform, based on the received access probe transmission, a persistence test with the access terminal; receive a subsequent probe transmission for the access channel grant request; and perform, based on the received subsequent probe transmission, a subsequent persistence test with the access terminal.

In another aspect, a wireless communications system is provided to include means for receiving an access probe transmission from an access terminal requesting an access channel grant; means for performing, based on the received access probe transmission, a persistence test with the access terminal; means for receiving a subsequent probe transmission for the access channel grant request; and means for performing, based on the received subsequent probe transmission, a subsequent persistence test with the access terminal.

In another aspect, a computer program product is provided to include a computer-readable non-volatile medium storing code thereon, the instructions, when read by a processor, causing the processor to receive an access probe transmission from an access terminal requesting an access channel grant; perform, based on the received access probe transmission, a persistence test with the access terminal; receive a subsequent probe transmission for the access channel grant request; and perform, based on the received subsequent probe transmission, a subsequent persistence test with the access terminal.

In another aspect, a method of managing a wireless network is provided to include monitoring a traffic load on an access channel in the wireless network; adjusting, responsive to the traffic load, a transmission delay parameter for an access station; and communicating the adjusted transmission delay parameter to the access station.

In another aspect, an apparatus for managing a wireless network is provided to include a traffic load monitor that monitors a traffic load on an access channel in the wireless network; a delay parameter adjustor that adjusts, responsive to the traffic load, a transmission delay parameter for an access station; and a delay parameter communicator that communicates the adjusted transmission delay parameter to the access station.

In another aspect, a computer program product is provided to include a computer-readable, non-volatile memory having code stored thereon, the code, when executed by a processor, causing the processor to monitor a traffic load on an access channel in the wireless network; adjust, responsive to the traffic load, a transmission delay parameter for an access station; and communicate the adjusted transmission delay parameter to the access station.

In another aspect, a method of wireless communications is provided to include assigning a plurality of delay class values to an access terminal; and communicating, to the access terminal, the assigned plurality of delay class values.

In another aspect, a wireless communications apparatus is provided to include a delay class value assigner that assigns a plurality of delay class values to an access terminal; and a delay class value communicator that communicates, to the access terminal, the assigned plurality of delay class values.

In another aspect, a wireless communications apparatus is provided to include means for assigning a plurality of delay class values to an access terminal; and means for communicating, to the access terminal, the assigned plurality of delay class values.

In another aspect, a computer program product is provided to include a computer-readable, non-volatile memory having code stored thereon, the code, when executed by a processor, causing the processor to assign a plurality of delay class values to an access terminal; and communicate, to the access terminal, the assigned plurality of delay class values.

In another aspect, a wireless communications method is provided to include transmitting a first access probe transmission from an access terminal requesting an access channel grant; performing a first persistence test for controlling congestion on an access channel; transmitting, subsequent to the performing the first persistence test, a second probe transmission for requesting the access channel grant; and performing, subsequent to the transmission of the second probe, a second persistence test for controlling congestion on an access channel.

In another aspect, a wireless communications apparatus is provided to include a probe transmitter that transmits a first access probe transmission from an access terminal requesting an access channel grant; a persistent test performer that performs a first persistence test for controlling congestion on an access channel; wherein the probe transmitter further transmits, subsequent to the performing the first persistence, a second probe transmission for requesting the access channel grant; and the persistent test performed further performs, subsequent to the transmission of the second probe, a second persistence test for controlling congestion on an access channel.

In another aspect, a wireless communications apparatus is provided to include means for transmitting a first access probe transmission from an access terminal requesting an access channel grant; means for performing a first persistence test for controlling congestion on an access channel; means for transmitting, subsequent to the performing the first persistence, a second probe transmission for requesting the access channel grant; and means for performing, subsequent to the transmission of the second probe, a second persistence test for controlling congestion on an access channel.

In another aspect, a computer program product is provided to include a computer-readable, non-volatile memory having code stored thereon, the code, when executed by a processor, causing the processor to transmit a first access probe transmission from an access terminal requesting an access channel grant; perform a first persistence test for controlling congestion on an access channel; transmit, subsequent to the performing the first persistence test, a second probe transmission for requesting the access channel grant; and perform, subsequent to the transmission of the second probe, a second persistence test for controlling congestion on an access channel.

In another aspect, a method of wireless communications is provided to include receiving a plurality of delay class values; and associating each delay class value in the plurality of delay class values with at least one service.

In another aspect, a wireless communications apparatus is provided to include a receiver that receives a plurality of delay class values; and an association module that associates each delay class value in the plurality of delay class values with at least one service.

In another aspect, a wireless communications apparatus is provided to include means for receiving a plurality of delay class values; and means for associating each delay class value in the plurality of delay class values with at least one service.

In yet another aspect, a computer program product is provided to include a computer-readable, non-volatile memory having code stored thereon, the code, when executed by a processor, causing the processor to receive a plurality of delay class values; and associate each delay class value in the plurality of delay class values with at least one service.

These and other aspects and their implementations are described in detail in the drawings, the description and the claims.

DETAILED DESCRIPTION

Wireless communication systems can include a network of one or more base stations to communicate with one or more wireless devices such as a mobile device, cell phone, wireless air card, mobile station (MS), user equipment (UE), access terminal (AT), or subscriber station (SS). Each base station can emit radio signals that carry signaling and data such as voice data and other data content to wireless devices. A base station can be referred to as an access point (AP) or access network (AN) or can be included as a part of an access network. A wireless communication system based on one or more wireless technologies (e.g., CDMA2000 1x and/or High Rate Packet Data (HRPD), and LTE) can include one or more radio access network controllers to control one or more base stations.

Figure 1:
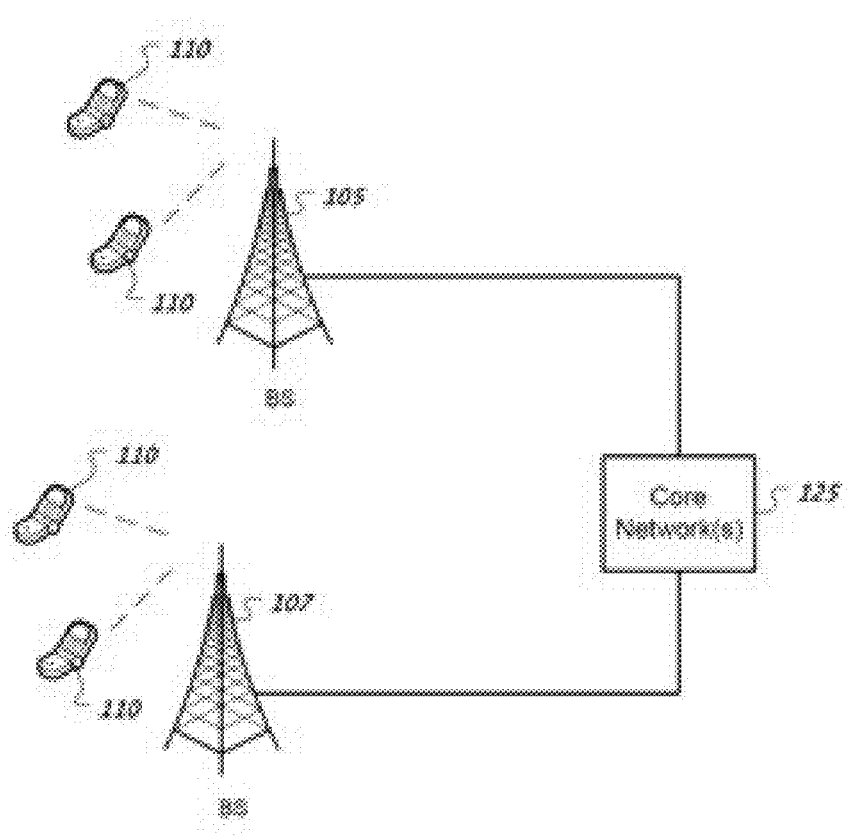
FIG. 1 shows an example of a wireless communication system having one or more base stations (BSs) and serving one or more wireless devices.

FIG. 1 shows an example of a wireless communication system. A wireless communication system can include one or more base stations (BSs) 105, 107 and one or more wireless devices 110. A base station 105, 107 can transmit a signal on a forward link (FL), or a downlink (DL), to one or more wireless devices 110. A wireless device 110 can receive a signal from one or more base stations via the respective forward link (FL) or a downlink (DL), and can transmit a signal on a reverse link (RL), or uplink (UL), to one or more base stations 105, 107. A wireless communication system can include one or more core networks 125 to control one or more base stations. In some implementations, a wireless communication system can include different access networks (ANs) for different radio access technologies (RATs).

Base stations 105, 107 can be configured to operate based on or use same or different wireless technologies. Examples of wireless communication systems that can implement the present techniques and systems include, among others, wireless communication systems based on Code Division Multiple Access (CDMA) such as CDMA2000 1x, High Rate Packet Data (HRPD), evolved HRPD (eHRPD), Evolved Universal Terrestrial Radio Access Network (E-UTRAN).

Figure 2:
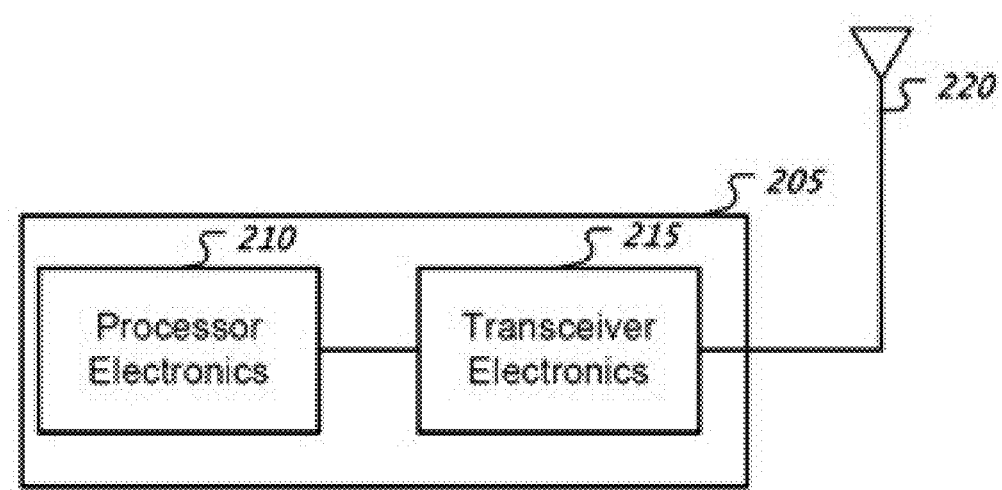
FIG. 2 shows an example of radio station architecture for a wireless communication device or a base station in FIG. 1.

FIG. 2 shows an example of radio station architecture for a wireless communication device 110 or a base station 105 or 107 in FIG. 1. A radio station 205 in this example includes processor electronics 210 such as a microprocessor that implements methods such as one or more of the wireless communication techniques presented in this document. The radio station 205 includes transceiver electronics 215 to send and/or receive wireless signals over one or more communication interfaces such as an antenna 220. The radio station 205 can include other communication interfaces for transmitting and receiving signaling and data. The radio station 205 can include one or more memories configured to store information such as data and/or instructions.

Radio access network has limited spectrum bandwidth and radio resource for access terminals to communicate with the network. When there are too many active users and/or they operate on high transmission rate, it may cause the access network overloaded. In CDMA2000 HRPD system, the reverse link load includes access channel load and the reverse traffic channel load. Typically, the access channel load is much smaller than the reverse traffic channel load. However, this statement may not be true after smart phones are introduced.

A smart phone typically includes a powerful application processor for better handling different applications simultaneously and a multi-mode wireless modem for different wireless connectivity. This could cause a smart phone consume a lot of battery power. In some cases, a battery of smart phone may not last for one day before recharging. In order to reduce battery consumption, smart phones are configured with a very short dormancy timer. Once a smart phone finishes transmission or receiving data, it would trigger to remove the traffic channel and enter the idle state. When it needs to transmit more data, the smart phone has to re-establish traffic channel connection first. The short dormancy timer setting creates additional signaling exchange between the smart phone and radio access network, and unnecessary overhead on the access channel and control channel. When a large number of access terminals use this mechanism to reduce their battery consumption, it will easily cause the access network overloaded. Therefore it is necessary to throttle traffic and control the loading on both reverse traffic channel and access channel.

In current CDMA2000 1x systems, for example, the access control is based on the mobile station's access overload class (ACCOLC). An ACCOLC is a value from 0 to 15. Each mobile station is assigned to one ACCOLC value. A regular mobile station's ACCOLC value is derived from its last digit of IMSI directly, while a special mobile station's ACCOLC is defined in the CDMA2000 1x specification. When the wireless access network is overloaded, the wireless access network uses redirection message to redirect mobile stations to other non-overloaded wireless networks according to mobile stations' ACCOCL values. ACCOLC 0 to 9 are treated as same priority in the redirection, while ACCOLC 10 and 11 are designated for special mobile stations which may have higher priority over regular mobile stations.

Figure 3:
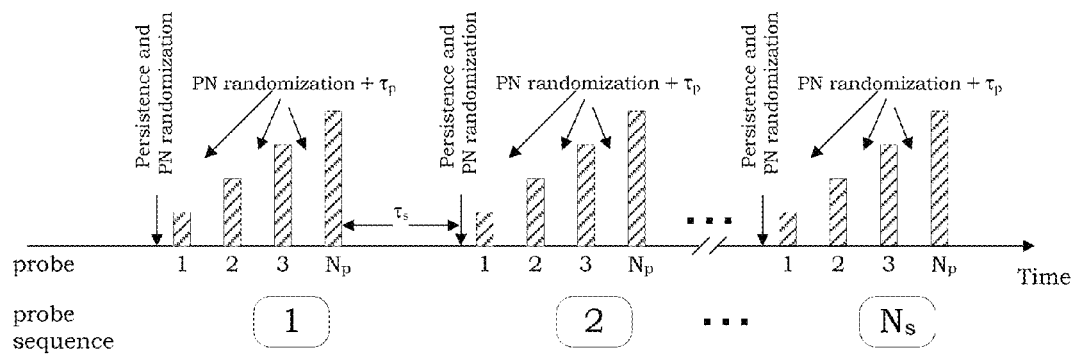
FIG. 3 shows an example of CDMA2000 HRPD access attempts.

On the other hand, CDMA2000 HRPD uses APersistence (AP) class to control of access terminals to access the wireless access network. AP 0~3 are mapped to ACCOLC 0~15. Before access to the wireless access network, the access terminal needs to perform a persistence test. If the persistence test passes, then the access terminal can access the network. Otherwise, the access terminal has to backoff a random time and try the persistence test again. FIG. 3 shows an example of CDMA2000 HRPD access attempts.

A CDMA2000 access attempt consists of Ns sequences of access probes. In each access sequence, it may include up to Np access probes. The access terminal starts to transmit from the first access probe. If it does not receive a response message (ACAck) from the access network in a given interval, it then backs off Tp time and continues transmission of the second access probe with increased transmitting power. The access probe transmission will repeat till the access terminal receives an ACAck from the access network or reaches the last access probe (Np). If the access terminal still does not receive a response from the access network after sending the last access probe, it backs off Ts time and then starts the next access probe sequence transmission. The sequence transmission will last till the last sequence (Nsth).

According to the CDMA2000 HRPD specification, prior to the transmission of the first probe, the access terminal performs a persistence test which is used to control congestion on the Access Channel. There is no requirement for access terminal to perform persistence test between access probes in the intra-sequence.

In M2M communication cases or even in legacy applications such as push to talk, there are cases that many wireless access terminals try to access CDMA2000 access network about same time. This could cause the CDMA2000 access network overloaded and has to adjust APersistence values during the intra probe sequence (between the first access probe and the last probe). Since those access terminals do not check APersistence values and perform persistent test during an intra-sequence, the access network loses control on the transmission from these access terminals once they start the first probe. Therefore these access terminals continue sending access probes to the congested network, and impacts system stability and performance of existing active users.

The time of intra-sequence transmission could last up from ten seconds to hundred seconds depending on the network configuration.

Assume Tp (i) is the time for inter-probe backoff at the i th access probe.

$$Tp(i)=T_{ACMPATProbeTimeout}+(yTotal \times AccessCycleDuration)$$

where
yTotal=yTotal+y; initial value of yTotal is 0
y is a random integer uniformly distributed in 0 and ProbeBackoff (<=15)
$T_{ACMPATProbeTimeout}$=128 slots
AccessCycleDuration<=256 slots
i is from 1 to Np.
The total time for intra-sequence access probes $T_{1-Np}$ is:

$$T_{1-Np}=Sum[Tp(i)], 1<=i<=ProbeNumStep$$

where
ProbeNumStep is the maximum number of probes per sequence (<15).

If the access network changes APersistence values within $T_{1-Np}$ to throttle access traffic, these access terminals that already started first access probes would not follow the instruction of the access network to delay accesses.

APersistence values are included in the AccessParameter message of CDMA2000 access network, and broadcast in the period at least every $N_{ACMPAccessParameters}$ slots. In order to control access traffic well, it requires frequently adjusting APersistence values according to the radio access network's loading condition. If the additional APersistence field is used for access control, the size of AccessParameter message is almost double. Therefore frequently broadcasting access channel information will increase control channel loading and reduce control channel efficiency.

The existing access class is per device based, not application or service based. Therefore an access terminal can have only one access class. If an access terminal has more than one application with different priorities, it has to use the single access priority to access the network no matter if the application is high or low priority. Since some applications may allow a large delay tolerance while other applications may allow only a small delay, the single access class per device based may no longer meet the access requirement.

This document discloses enhanced access control mechanisms to address above problems. The enhanced access control mechanism include one or more of:

Check APersistences prior to sending every access probe, and apply persistence test not only on the first access probe, but also on every access probe so that access traffic from access terminals is under control of the access network no matter when the access network adjust values of APersistence.

Dynamically including or excluding APersistence information in the AccessParameter message so as to reduce the loading of control channel.

Redefine some APersistence classes as access-profile based classes, and associate APersistence class with the delay tolerances so that the access terminal may have more than one access-profile class, each of which is associated with one or more different services/applications in that delay tolerance category. This allows an access terminal to use the appropriated access-profile class to access the network.

The enhanced access control mechanism is based on, in one aspect, following principles.

In the non-overloaded case, the radio access network may set APersistence values to zero or small fixed values to allow access terminals to have a large chance to pass the persistence test and access the radio access network. Since APersistence is a fixed value, the access network will not need to continually update AccessParameter and access terminals are not necessary to track the change of AccessParameter accordingly. Therefore it will help to save battery life of access terminals. During the overloaded period, the radio access network may timely adjust the APersistence values dynamically according to network loading condition so that it allows fast control and throttling the access traffic.

The dynamic including and excluding APersistences algorithm uses two thresholds for the access network to determine whether APersistence values need to be included or excluded in the AccessParameter message.

The Access Overload Threshold for Including APersistence (AOT-In) is used for the access network to include APersistences in the AccessParameter message. If the network loading exceeds the AOT-In value, then the access network includes APersistence values in the AccessParameter message.

Access Overload Threshold for Excluding APersistence (AOT-Ex) is used for the access network to exclude APersistences from the AccessParameter message. If the network loading is below the AOT-Ex value, then the access network may exclude APersistence values from the AccessParameter message to reduce the control channel overhead.

Figure 4:
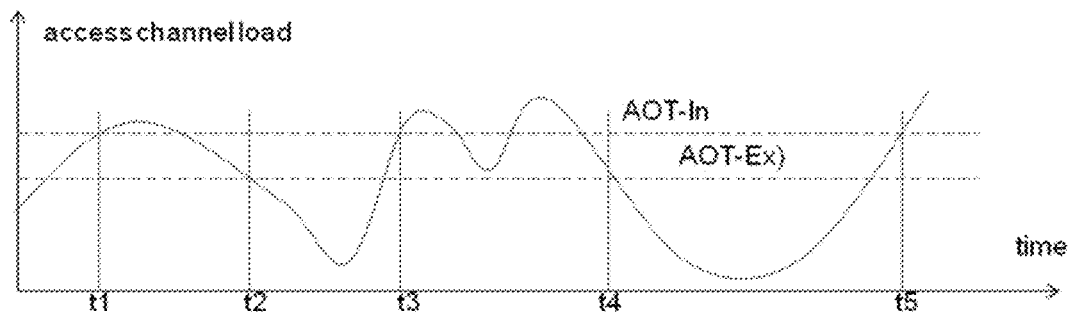
FIG. 4 shows an example of dynamically including or excluding APersistences according to the network loading and thresholds of AOT-In and AOT-Ex.

FIG. 4 shows an example of dynamically including or excluding APersistences according to the network loading and thresholds of AOT-In and AOT-Ex.

At the time t1, the network load exceeds the threshold of AOT-In. Therefore the radio access network sets APersistence values and include them in the AccessParameter message. From the time t1 to t2, the network load varies. The access network adjusts APersistence values timely to throttle access traffic based on the loading condition. As the time moves to t2, the network load gradually reduces to below the threshold AOT-Ex. The access network may exclude those APersistences from the AccessParameter so as to reduce the overhead on the Control Channel. During the time interval from t2 to t3, access terminals could use the default APersistence value for that excluded access class(s) to perform the persistence test no matter what the network load is. When the load increases and reaches the threshold AOT-In again at the time t3, the radio access network sets APersistences according to the network load condition and includes them in the AccessParameter message again. The radio access network adjusts APersistence values based on the loading as the time moves to t4 at which the network load is below the threshold AOT-Ex. In the period of t3 to t4, access terminals uses received APersistence values to perform persistence tests. When it is at t4, the radio access network may exclude APersistences from the AccessParameter message, and access terminals could again use the default APersistence value for that excluded access class to perform the persistence test.

In CDMA2000 HRPD system, Reverse Activity (RA) is a physical layer measurement about the reverse link load. Since the RA measurement is based on Rise of Thermal (ROT) which includes both reverse traffic channel and access channel loads, the reverse link load control contains throttling on both reverse traffic channel and access channel.

The radio access network uses Reverse Activity Bit (RAB) to control the reverse link activity for active users. RAB is designed to maximize the total reverse link throughput. In normal cases, RAB ratio (the ratio of busy times (RAB=1) vs. non-busy times (RAB=0) in a given interval) is maintained at a certain percent, for example 40%. If RAB ratio is consistently above a certain percent, for example 50%, then the reverse link is overloaded, and the access network reduces the transmit rate over traffic channels.

On the other hand of reverse link load control, the access network also restricts new access terminals to access the network when the radio access network is overloaded. In CDMA2000 HRPD system, APersistence value is used to indicate the loading condition and throttle the access traffic from access terminals that are not in active state. Increasing APersistence value will delay access terminals to access the radio network, eventually reduce the traffic over the reverse link. When the reveres link is approaching to full capacity, the network adjusts APersistence value to reduce the number of new access terminals to access the network.

Figure 5:
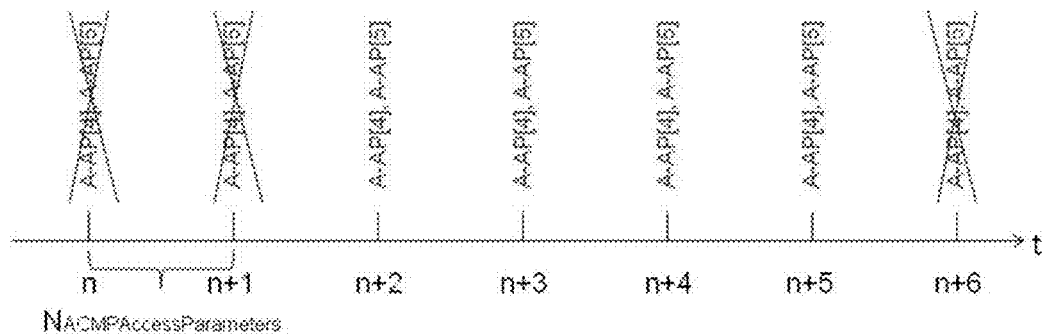
FIG. 5 is an example of access network dynamically including or excluding APersistence in the AccessParameter message.

FIG. 5 is an example of access network dynamically including or excluding APersistence in the AccessParameter message. The access network broadcasts the AccessParameter message in the period of $N_{ACMPAccessParameter}$. At the time between n and (n+1), the access network is not overloaded. The access network may not include additional APersistences A-AP[4] and A-AP[5] in that period.

When the radio access network detects overloaded since the time (n+2), the radio access network adjusts and includes A-AP[4] and A-AP[5] from the time of (n+2) through (n+5). When it is at n+6, the access network's load is back to normal. The access network may exclude A-AP[4] and A-AP[5] at the time of (n+6).

Figure 6:
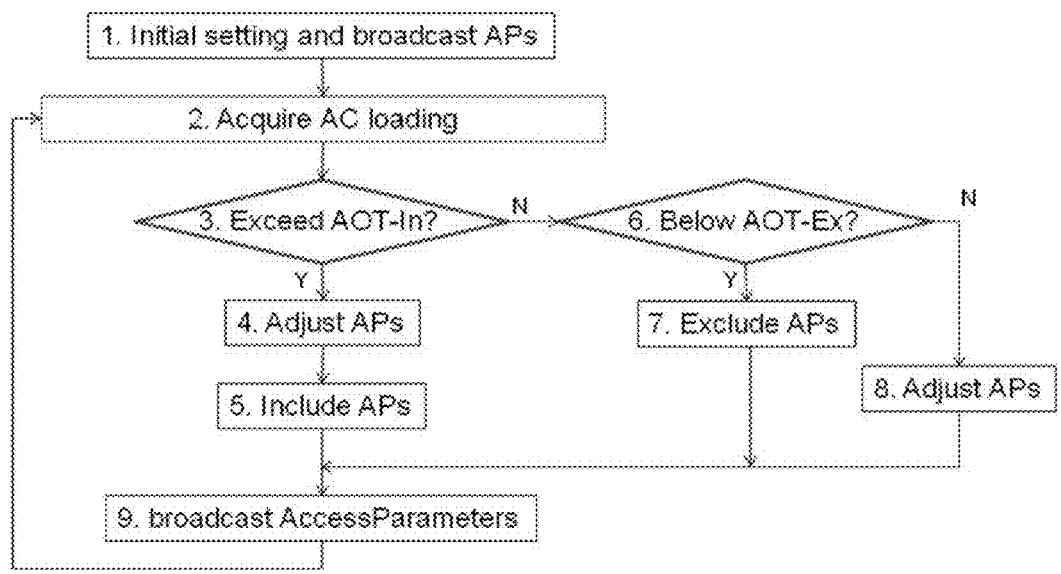
FIG. 6 is a flowchart representation of a procedure for throttling access traffic.

FIG. 6 shows an example of the procedure of access network throttling access traffic via adjusting APersistence values and dynamically including or excluding them in the AccessParameter message. In this example, the following nine steps are performed.

1. The radio access network may include APersistence parameters in the AccessParameter message using the default values as initial parameter of additional APersistences.
2. The radio access network acquires the loading information such as reverse link Rise of Thermal (ROT) or RAB ratio or other measurement. The loading could be a sector based measurement and can be converted to the access profile class based measurement.
3. The radio access network checks whether the loading exceeds the Access Overload Threshold for Including (AOT-In)? If it does not, then go to the step 6.
4. Otherwise, the radio access network adjusts one or more APersistence values according to the network loading condition to control the access traffic for that sector or particular access profile class(s).
5. The radio access network includes one or more APersistence values in the AccessParameter message and go to the step 9
6. The access network checks whether the network loading is below the Access Overload Threshold for Excluding (AOT-Ex). If it is not below the AOT-Ex, then go to the step 8.
7. Otherwise, the access network excludes APersistence field(s) from the AccessParameter message and goes to the step 9.
8. The access network may adjust one or more APersistence values according to the network loading condition to control the access traffic for that sector or access profile class(s).
9. The access network sets new AccessSignature in the QuickConfig and AccessParameter messages if there is any change in the AccessParameter message, and broadcasts over the control channel.

Prior to the transmission of the each access probe, the access terminal acquires a persistence value for the access profile class. If the AccessSignature is changed from the last received QuickConfig and/or AccessParameter message, the access terminal starts access channel supervision procedure to receive the latest AccessParameter. Otherwise, the access terminal uses the latest APersistence for persistence test.

Assume [i] is the access profile class which an application or service belongs to. APersistence[i] is either the (i+1)st occurrence of the APersistence field in AccessParameters message if the (i+1)st occurrence of the APersistence field is included in the message or the 1st occurrence of the APersistence field in the AccessParameters message if the (i+1)st occurrence of the APersistence field is not included in the message.

After acquiring APersistence[i] and prior to the transmission of every access probe, the access terminal performs a persistence test on the Access Channel. Let the value p equals to APersistence[i] acquired before. When p is not zero, the persistence test consists of comparing a uniformly distributed random number x, 0<x<1. If x<p the test is said to succeed. If the persistence test succeeds or if the number of consecutive unsuccessful persistence tests exceeds 4/p, the access terminal may transmit in the first upcoming Access Channel Cycle such that no portion of the access probe overlaps with the Reverse Link Silence Interval and no portion of the access probe plus the time interval that is required to receive the corresponding ACAck message will overlap with slots when the access terminal does not receive the Forward Channel. If any portion of the access probe overlaps with the Reverse Link Silence Interval, then the access terminal does not transmit the access probe and re-starts the procedures for Transmission of Probe from the beginning. Otherwise, if p is not equal to zero, the access terminal repeats the above-mentioned Silence Period Test and then the Persistence Test starting from the next Access Channel Cycle.

Figure 7:
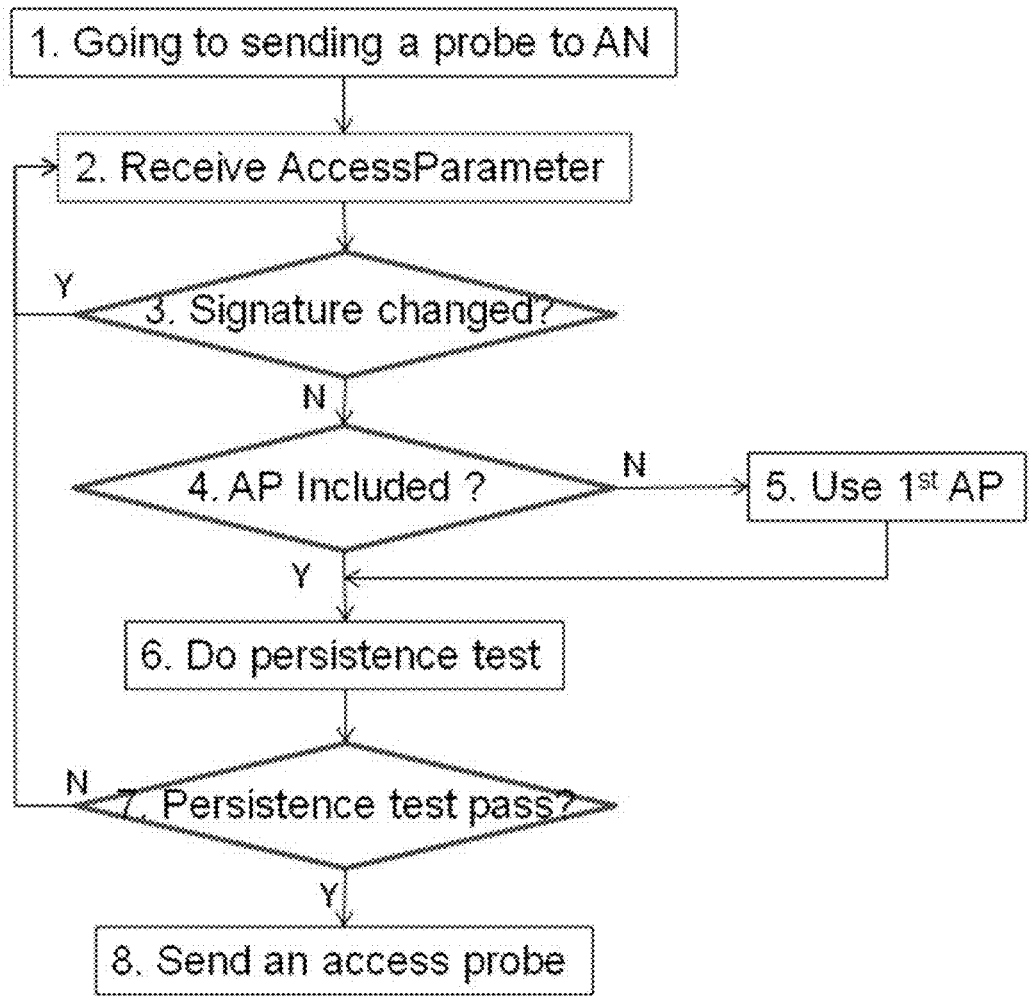
FIG. 7 is a flowchart representation of an access terminal procedure for throttling access traffic.

FIG. 7 is the procedure of access terminal throttling access traffic according to received additional APersistence values. In this example, the procedure includes the following eight steps.

1. The access terminal is going to access the access network via sending an access probe.
2. The access terminal monitors the control channel and receives the QuickConfig and AccessParameter messages.
3. The access terminal checks whether the AccessSignature in the QuickConfig or AccessParameter message is changed from the last received QuickConfig or AccessParameter message. If the AccessSignature is changed, then go to the step 2 until receiving the latest access parameter in the AccessParameter message.
4. The access terminal checks whether the additional APersistence field is included in the AccessParameter message. If it is included, then go to the step 6.
5. Otherwise, if the additional APersistence field for that access profile class is not included, the access terminal uses the 1st APersistence value in the AccessParameter as the additional APersistence of that access profile class.
6. The access terminal performs the persistence test using APersistence value of that access profile class.
7. The access terminal checks whether the persistence test succeeds or not. If the persistence test fails, then go to the step 2 and repeat the procedure until the number of consecutive unsuccessful persistence tests exceeds 4/APersistence for the class.
8. The access terminal transmits an access probe to the access network and waits for the ACAck sent by the access network.

In order to apply for a category of services or applications to an access profile class in CDMA2000, this patent document provides access profile classes with a range of delay tolerance.

| Class | Delay Tolerance | Note |
| --- | --- | --- |
| 0 | Immediately access | 0 |
| 1 | small delay tolerance | <2 seconds |
| 2 | Medium delay tolerance | 2-60 seconds |
| 3 | long delay tolerance | 1 minute to 1 hour |
| 4 | Extreme long delay tolerance | >1 hour |
| Others | Reserved | |

Therefore one access terminal may belong to one or more access profile classes depending on applications that it has. If the access terminal is to access the network to request a connection for a particular application, the access terminal uses the APersistence value for that access profile class to perform the persistence test.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communications method, comprising:
   transmitting multiple access probe transmissions from an access terminal requesting an access channel grant; and
   performing, prior to transmitting every one of the multiple access probe transmissions, a persistence test between two consecutive multiple access probe transmissions for controlling congestion on an access channel, so that no access probe transmission is performed without first performing the persistence test,
   wherein the performing the persistence test includes:
   comparing a random number x with a persistence number p; and
   deciding to transmit a corresponding access probe when the random number x is less than the persistence number p, wherein x is between 0 and 1 and p is not zero.

2. The method of claim 1, further comprising:
   receiving a transmission delay parameter; and
   delaying a transmission according to the received transmission delay parameter.

3. A wireless communications apparatus, comprising:
   a probe transmitter that transmits multiple access probe transmissions from an access terminal requesting an access channel grant;
   a persistent test performer that performs, prior to transmitting every one of the multiple access probe transmissions, a persistence test between two consecutive multiple access probe transmissions for controlling congestion on an access channel, so that no access probe transmission is performed without first performing the persistence test
   wherein the performing the persistence test includes:
   comparing a random number x with a persistence number p; and
   deciding to transmit a corresponding access probe when the random number x is less than the persistence number p, wherein x is between 0 and 1 and p is not zero.

4. The apparatus of claim 3, further comprising:
   a transmission delay parameter that receives a transmission delay parameter; and
   a transmission delayer that delays a transmission according to the received transmission delay parameter.

5. A wireless communications apparatus, comprising:
   an access terminal sending multiple access probe transmissions for requesting an access channel grant, and
   performing, prior to transmitting every one of the multiple access probe transmissions, a persistence test between two consecutive multiple access probe transmissions for controlling congestion on an access channel, so that no access probe transmission is performed without first performing the persistence test,
   wherein the performing the persistence test includes:
   comparing a random number x with a persistence number p; and
   deciding to transmit a corresponding access probe when the random number x is less than the persistence number p, wherein x is between 0 and 1 and p is not zero.

6. The apparatus of claim 5, further operative for:
   receiving a transmission delay parameter; and
   delaying a transmission according to the received transmission delay parameter.

7. A computer program product, comprising a computer-readable, non-volatile memory having code stored thereon, the code, when executed by a processor, causing the processor to:
   transmit multiple access probe transmissions from an access terminal requesting an access channel grant; and
   perform, prior to transmitting every one of the multiple access probe transmissions, a persistence test between two consecutive multiple access probe transmissions for controlling congestion on an access channel, so that no access probe transmission is performed without first performing the persistence test,
   wherein the performing the persistence test includes:
   comparing a random number x with a persistence number p; and
   deciding to transmit a corresponding access probe when the random number x is less than the persistence number p, wherein x is between 0 and 1 and p is not zero.

8. The computer program product recited in claim 7, wherein the code, when executed, further causes the processor to:
   receive a transmission delay parameter; and
   delay a transmission according to the received transmission delay parameter.

9. The method of claim 1, wherein the persistence number p is received from network and wherein the persistence number p is selected based on access profile of an application for which access connection is requested by the corresponding access probe, wherein access profile of the application depends on delay tolerance of the application.

10. The method of claim 1, further comprising:
    if the number of consecutive unsuccessful persistence tests exceeds 4/p, the access terminal transmits in a next upcoming slot of the access channel.

* * * * *